US007120468B1

(12) United States Patent
Wilhoyte et al.

(10) Patent No.: US 7,120,468 B1

(45) Date of Patent: Oct. 10, 2006

(54) SYSTEM AND METHOD FOR STEERING DIRECTIONAL ANTENNA FOR WIRELESS COMMUNICATIONS

(75) Inventors: Michael E. Wilhoyte, Santa Rosa, CA (US); Michael V. Goettemoeller, Mountain View, CA (US)

(73) Assignee: Texas Instruments Incorporated, Dallas, TX (US)

( * ) Notice: Subject to any disclaimer, the term of this patent is extended or adjusted under 35 U.S.C. 154(b) by 28 days.

(21) Appl. No.: 11/107,046

(22) Filed: Apr. 15, 2005

(51) Int. Cl.

| | |
|---|---|
| ***H04M 1/00*** | (2006.01) |
| ***H04B 7/00*** | (2006.01) |
| ***H04B 1/00*** | (2006.01) |
| ***H04B 7/14*** | (2006.01) |

(52) U.S. Cl. .................... 455/562.1; 455/25; 455/63.4; 455/575.7; 455/269

(58) Field of Classification Search .................. 455/25, 455/63.4, 562.1, 575.7, 269
See application file for complete search history.

(56) References Cited

U.S. PATENT DOCUMENTS

| | | | | |
|---|---|---|---|---|
| 6,731,240 | B1 * | 5/2004 | Dybdal et al. | 342/359 |
| 2004/0224637 | A1 * | 11/2004 | Silva et al. | 455/63.4 |
| 2005/0037822 | A1 * | 2/2005 | Regnier et al. | 455/575.5 |
| 2006/0073850 | A1 * | 4/2006 | Cha et al. | 455/562.1 |

* cited by examiner

*Primary Examiner*—Nay Maung
*Assistant Examiner*—Wen Huang
(74) *Attorney, Agent, or Firm*—Steven A. Shaw; W. James Brady; Frederick J. Telecky, Jr.

(57) ABSTRACT

A system and method for determining an optimal antenna position of a directional antenna in a wireless communication system are described. The optimal antenna position is determined by calculating a steering metric value for possible antenna positions and the antenna position with the highest steering metric value is selected as the optimal antenna position.

8 Claims, 1 Drawing Sheet

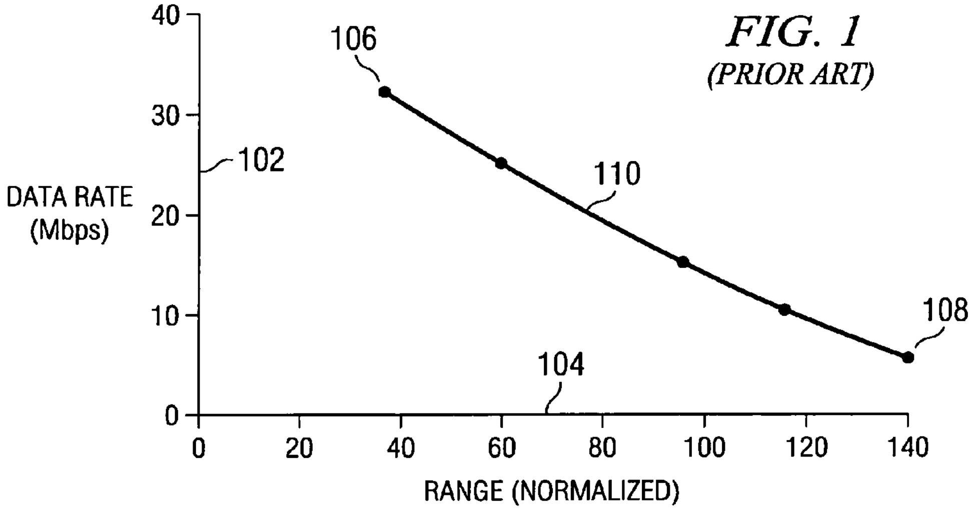
*FIG. 1*
*(PRIOR ART)*
*FIG. 2*
*(PRIOR ART)*
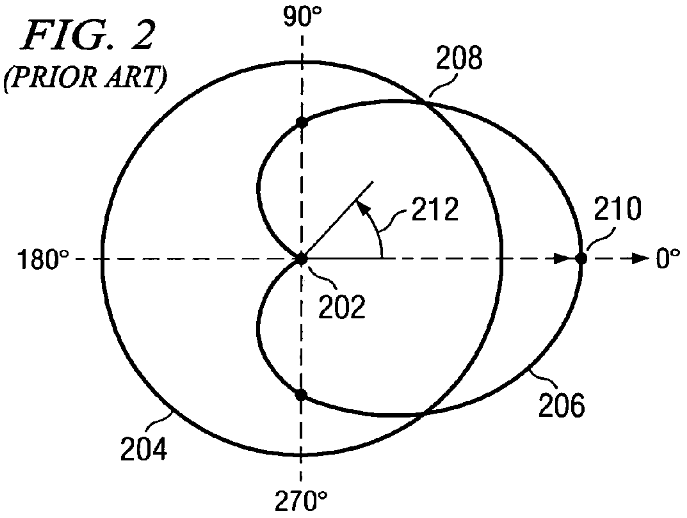
*FIG. 3*
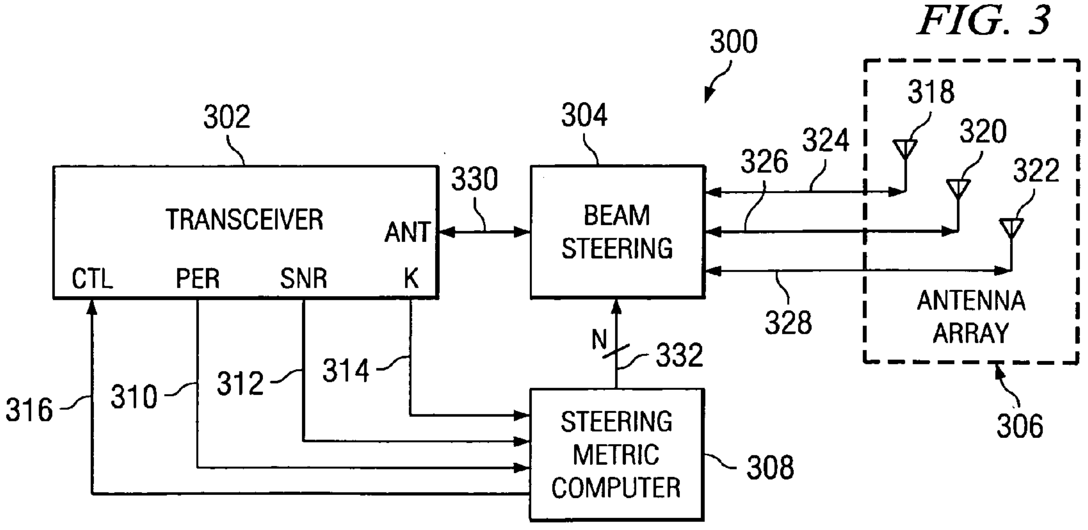

SYSTEM AND METHOD FOR STEERING DIRECTIONAL ANTENNA FOR WIRELESS COMMUNICATIONS

BACKGROUND

1. Field of the Invention

The present disclosure relates to wireless data communication in general, and, in particular, to wireless data communication systems using switched-beam or other directional antenna technology, and the computation of a steering metric (SM) to enable optimization of antenna position (antenna pointing direction).

2. Description of the Related Art

Wireless data communications systems enable data transmission among two or more network elements. An example is a wireless local-area network (WLAN) system, widely used for connecting network elements in homes and offices, based on IEEE standard 802.11x (data rates from 6 to 54 Mbps). Operating range in a wireless system typically decreases with increasing data rate, for a given transmit power (which is often limited by law). Typical wireless network elements such as a WLAN access point (AP) use omni-directional antennas for receiving and transmitting data because network elements typically have no knowledge of the location of other network elements desiring a wireless connection.

Directional antennas have the desirable property of increasing the gain and hence communication range, by focusing the transmitted or received energy into a narrower beam. Many known approaches for generating such directional beams are used, including switched antennas, phased arrays of antenna elements, and others. One such approach is known as switched-beam antenna. The switched-beam antenna has plurality of typically identical beams, each covering an angular range with some fraction of 360 degrees, and oriented to direct the energy of the beam in a different direction. For example, a 6-beam antenna has six beams approximately 60 degrees wide, each beam typically oriented 60 degrees from the other, to provide full 360 degree coverage. Such antenna provides improved gain compared with an omni-directional antenna, and also provide increased transmit and receive range.

Application of such directional antenna in a wireless data communication system typically requires an automated means of determining the optimal antenna position to use for communication with other network elements at a given time. The "antenna position" refers to the angular position of a directional beam, or the omni-directional pattern. Typically, each of the many given antenna positions is tried to determine which position gives the best results. Each trial evaluates a parameter directly or indirectly indicative of the quality of data and compares the result for each position to determine the optimal position to use for communication. One widely-used such parameter is received signal strength indication (RSSI), which is typically available as analog or digital data from the automatic gain control (AGC) circuit in the network element receiver.

At lower data rates, and/or in an environment with minimum multipath, the use of RSSI to determine optimal antenna position can be quite effective. The determination of RSSI, as the antenna position changes, is typically simpler and quicker than the determination of packet error rate (PER). As a result, training time and data overhead is reduced by using RSSI at low data rates.

However, at higher data rates, multipath effects the quality of the received data (as measured by packet error rate PER) more that than RSSI. The PER might be significantly better using an antenna position having a lower-than-peak RSSI. Many wireless communication systems support widely-varying data rates. For example, WLAN standard 802.11g provides for data rates typically ranging from 6 to 54 Mbps. Lower rates are used in difficult transmission path conditions (long distance, high multi-path, interference from other network elements), while higher rates are used in better conditions. Use of only PER or RSSI to determine optimum antenna position over such a wide range of bandwidth is non-optimal. Therefore, a system and method is needed to effectively optimize antenna positioning when using a directional antenna wireless communication system while minimizing overhead (data bits not directly carrying user information) with a relatively shorter training time than traditionally used.

SUMMARY

The present application describes a system and method for determining the optimal antenna position (pointing angle and/or azimuth and/or elevation angle) of a directional antenna in a wireless communication system by computing a steering metric (SM) at each of a multiplicity of antenna positions. This steering metric is a function of receiver gain G (indirectly measuring RSSI), packet error rate (PER), and empirically-derived constants. The antenna position having the highest steering metric value is then selected as the optimal one to use. The method provides improved optimization of antenna position even with widely-varying data rates. Further, reduced data overhead (training bits) is required to determine the optimal antenna position.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

FIG. 1 is a graph of typical range versus data rate for an exemplary known prior art WLAN system.

FIG. 2 is a polar plot of antenna gain for both an omni-directional and directional antenna of an exemplary known prior art WLAN system.

FIG. 3 is a block diagram of a wireless network element using a directional switched-beam antenna and the steering metric computation system to determine optimal antenna position.

DETAILED DESCRIPTION

The description that follows presents a series of systems, apparati, methods and techniques that facilitate additional local register storage through the use of a virtual register set in a processor. While much of the description herein assumes a single processor, process or thread context, some realizations in accordance with the present invention provide expanded internal register capability customizable for each processor of a multiprocessor, each process and/or each thread of execution. Accordingly, in view of the above, and without limitation, certain exemplary exploitations are now described.

FIG. 1 is a graph of the known general relationship between data rate and range in a typical 802.11 WLAN system. The vertical axis 102 represents data rate in Mbps; the horizontal axis 104 represents a dimensionless measure of relative distance. Actual distance achieved is dependent on many factors other than data rate, such as transmit power, obstructions in the path, interfering signals, and amount and nature of multi-path. The plot 110 shows that the range at the highest data rate (data point 106) is less than one-third the range at the lowest data rate (data point 108).

FIG. 2 illustrates polar plots of antenna gain for both known art omni-directional and directional antenna. The length of a vector from the center to the polar plot of gain represents the gain of the antenna as a function of angular position. The omni-directional antenna with response plot 204 has equal gain at any azimuth angle 212 around the complete 360 degree range. The plot 206 of the directional antenna shows antenna gain having a peak at 0 degrees azimuth 210, and a null 202 at 180 degrees. Intermediate azimuth values have decreasing gain as the azimuth angle changes between 0 and 180 degrees. Gain of the example directional antenna is equal to the omni-directional antenna at an azimuth of approximately 60 degrees, as shown at intersection 208. At 0 degrees azimuth angle, the directional antenna with 60 degree beam width has approximately 4 dBi gain compared to the omni-directional. This increased gain offsets the decrease in range at high data rates seen in FIG. 1.

FIG. 3 is a block diagram of a wireless network element 300 using a directional switched-beam antenna and the steering metric computation system for determining an optimal antenna position. A data transceiver 302 comprises data transmitter and data receiver. The data transceiver 302 outputs representative of SNR 312, PER 310, and a data rate index K 314. An input CTL 316 is used to control various transceiver parameters during a training period. The transceiver 302 has a driven (when receiving data) and driving (when transmitting data) connection with beam steering subsystem 304 through connection 330. The beam steering subsystem 304 is a signal phasing subsystem, which outputs a unique set of multiple signals.

In the present example, the beam steering subsystem 304 outputs three signals 324, 326, and 328, substantially identical to the input signal received from transceiver 302, except for variation in amplitude and phase among the three output signals. The three variable amplitude and phase signals have a driving and driven connection with a plurality of antenna elements 318, 320, and 322 arrayed in such a pattern as to cause directional beams to be produced dependent on the phase and amplitude variation provided by beam steering subsystem 304. The amount of phase shift and amplitude variation applied to each signal is controlled by steering control data on bus 332, this data being generated by a steering metric computer 308. The steering metric computer 308 can be any computer configured to execute the steering metric algorithm. One skilled in the art will appreciate that the steering metric computer 308 and the beam steering unit 304 can be an integrated unit. Further, various units of the wireless network element 300 cane be configured in a single integrated unit. For example, the transceiver 302 can be an integrated transceiver in the steering metric computer and the steering metric computer 308 can include position control mechanism for the beam steering unit 304.

Steering control signals from the steering metric computer 308 are typically an N-bit digital word, providing up to 2^N selectable antenna positions (directions), including omnidirectional. The steering metric computer 308 has a driven connection with the RSSI output 312, the PER output 310, and the data rate index K 314 of the transceiver 302. During the training period, the steering metric computer 308 steps through multiple steering control outputs, sweeping the antenna beam through a desired circle or fraction of a circle. For each antenna position, the steering metric computer 308 processes these three signals RSSI, PER, and data rate index K from transceiver 302, according to the following steering metric (SM) algorithm at each data rate index, k:

$$SM(k)=(1-C(k))*(0.5-\mathrm{PER}(k))+[C(k)*(G(k)-\mathrm{mean}G)]/\mathrm{sigma}G$$

where:

C(k)=weight applied dependent on rate, which decreases as rate increases, to put more emphasis on PER at higher data rates;

PER(k)=estimated PER based on data transmissions to the intended station;

G(k)=gain reduction applied in the receiving station while receiving the data sent by the station to the AP in the acknowledgement and is directly proportional to received signal strength;

meanG=constant mean value of the gain statistic determined based on empirical data from data collection at various data rates;

sigmaG=standard deviation of the gain statistic determined based on empirical data from data collection at various data rates.

As further described below, the disclosed steering metric algorithm provides a combination of desirable properties not available concurrently in the known art, including more optimal selection of antenna position over widely-varying data rates, and reduction in overhead to support this selection process.

Examination of the SM(k) equation yields insight into the system operation. The values for C(k) range typically over 0 to 1, with low C(k) corresponding to high data rates, and high C(k) corresponding to low data rates. For example, consider 8 data rates for a representative 802.11g system, and typical corresponding C(k) and 1−C(k):

| k: | rate: | C(k): | 1-C(k): |
|---|---|---|---|
| 1 | 6 Mbps | .8 | .2 |
| 2 | 8 Mbps | .7 | .3 |
| 3 | 11 Mbps | .6 | .4 |
| 4 | 15 Mbps | .5 | .5 |
| 5 | 21 Mbps | .4 | .6 |
| 6 | 29 Mbps | .3 | .7 |
| 7 | 40 Mbps | .2 | .8 |
| 8 | 54 Mbps | .1 | .9 |

Examining the equation for SM(k) it is clear that, at low data rates, the 1−C(k) term is low, minimizing the term $$(1-C(k))*(0.5-\mathrm{PER}(k))$$

and thereby minimizing the effect of PER on SM(k). Conversely, at high data rates, the C(k) term is low, minimizing the term $$C(k)*(G(k)-meanG)/sigmaG$$

and thereby minimizing the effect of received signal strength (RSSI).

In the preferred embodiment, PER(k) is normalized to the approximate range 0 to 1, so that the range of term i.) over the full C(k) range is roughly −0.5 to +0.5. Similarly, (G(k)−meanG)/sigmaG in term ii.) ranges over typically a −1 to +1 range, causing term ii.) to also range over approximately −1 to 1.

The result of this normalization is that, at a nominal PER of 0.5 and nominal G of meanG, both terms go to zero. As PER deviates toward zero (better data quality), term i.) increases. At high data rates term i.) thus predominates, allowing PER to dominate the SM(k) value. As gain G increases (indicating increased signal and SNR, better data quality), term ii.) increases. At low data rates term ii.) thus predominates, allowing SNR to dominate the SM(k) value. The selection of C(k) for the various data rates may be modified to modify the behavior of the SM(k) function. Also, the choice of constants meanG and sigmaG, which are based on empirical data, may also be modified to modify the behavior of the SM(k) function.

The steering metric (SM) value for each antenna position, including the omni-directional position, is stored for comparison with all others generated during the training sweep. When the sweep is complete, one or more of the stored SM values will typically be larger than the others, indicating the optimal antenna position or positions. Control data 332 appropriate to select that optimum position are then output to beam steering 304.

If there is little or no variation in SM on completion of the training sweep, it may be difficult or impossible to determine which antenna position is optimal. In this case, control signals CTL 316 are generated by the steering metric computer 308 and drive transceiver 302, commanding it to modify one or more parameters before a new training sweep. Adjustable parameters include, but are not limited to, data rate and transmit power. For example, at high data rates, PER has the most impact on SM. If the first sweep shows little or no variation in PER, transmit power of one of the network elements is reduced to increase PER to a desired level. A sweep at this revised power level will now show a peak in SM at one of the antenna positions. Alternatively, power level may be unchanged, while data rate is increased until PER increases sufficiently.

At low data rates, RSSI as measured by G has the most impact on SM. If the first sweep shows little or no variation in G, transmit power of one of the network elements is reduced to decrease RSSI to a desired level. A sweep at this revised power level will typically now show a peak in SM at one of the antenna positions. The omni-directional antenna position is typically used during adjustment of power level or data rate, moving PER or RSSI to an appropriate target value. If the target value chosen is somewhat less than optimum, one of the plurality of antenna positions other than omni-directional will typically cause a peak in PER or RSSI. Once that optimal antenna position is known, power level or data rate may be adjusted again to increase system margins after training.

Those skilled in the art to which the invention relates will appreciate that yet other substitutions and modifications can be made to the described embodiments, without departing from the spirit and scope of the invention as described by the claims below. Realizations in accordance with the present invention have been described in the context of particular embodiments. These embodiments are meant to be illustrative and not limiting. Many variations, modifications, additions, and improvements are possible. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A method of determining an optimal antenna position of a directional antenna in a wireless communication system, comprising calculating a steering metric value SM(k) at each data rate index (k) for a plurality of possible beam positions for the directional antenna; and selecting one of the plurality of possible antenna positions for the directional antenna having a highest steering metric value, wherein the steering metric value SM(k) is given by:

$$SM(k)=(1-C(k))*(0.5-\mathrm{PER}(k))+[C(k)*(G(k)-\mathrm{mean}G)]/\mathrm{sigma}G,$$

where:

k=a data rate index of the wireless communication channel,

C(k)=a weight applied based on data rate of the wireless communication channel,

PER(k)=an estimated packet error rate of the wireless communication channel,

G(k)=gain reduction applied during reception of an acknowledgement packet on the wireless communication channel, meanG=a constant mean value of G(k) determined based on empirical data from data collection at various data rates, and sigmaG=standard deviation of the G(k) determined based on empirical data from data collection at various data rates.

2. The method of claim 1, wherein the optimal antenna position is the one of the plurality of antenna positions having the highest steering metric value.

3. The method of claim 1, wherein the packet error rate (PER), the received signal strength indication (RSSI), and the data rate index (k) are determined by a transceiver configured to receive data from the wireless communication channel.

4. A system for determining an optimal antenna position of a directional antenna in a wireless communication system, comprising:

a transceiver;

a beam steering unit coupled to the transceiver; and a steering metric calculating unit coupled to the transceiver, wherein the steering metric calculating unit is configured to calculate a steering metric value SM(k) at each data rate index (k) for a plurality of possible antenna positions for the directional antenna; and select one of the plurality of possible antenna positions for the directional antenna having a highest steering metric value, wherein the steering metric value SM(k) is given by:

$$SM(k)=(1-C(k))*(0.5-\mathrm{PER}(k))+[C(k)*(G(k)-\mathrm{mean}G)]/\mathrm{sigma}G,$$

where:

k=a data rate index of the wireless communication channel,

C(k)=a weight applied based on data rate of the wireless communication channel,

PER(k)=an estimated packet error rate of the wireless communication channel,

G(k)=gain reduction applied during reception of an acknowledgement packet on the wireless communication channel, meanG=a constant mean value of G(k) determined based on empirical data from data collection at various data rates, and sigmaG=standard deviation of the G(k) determined based on empirical data from data collection at various data rates.

5. The system of claim 4, wherein the optimal antenna position is the one of the plurality of antenna positions having the highest steering metric value.

6. The system of claim 5, wherein the beam steering unit is configured to adjust position of the directional antenna according to the optimal antenna position.

7. The system of claim 4, wherein the packet error rate (PER), the received signal strength indication (RSSI), and the data rate index (k) are determined by the transceiver configured to receive data from the wireless communication channel.

8. The system of claim 4, wherein the transceiver, the beam steering unit, and the steering metric calculating unit are integrated into a single unit.

* * * * *